Aug. 17, 1926.  1,596,162
A. B. DRÄGER
EYEPIECE
Filed Feb. 10, 1926

INVENTOR
ALEXANDER BERNHARD DRÄGER
BY
ATTORNEYS

Patented Aug. 17, 1926.

1,596,162

UNITED STATES PATENT OFFICE.

ALEXANDER BERNHARD DRÄGER, OF LUBECK, GERMANY.

EYEPIECE.

Application filed February 10, 1926, Serial No. 87,251, and in Germany January 27, 1925.

The invention relates to eye pieces, and the object of the invention is to provide an eyepiece which shall be especially adapted for use in gas masks.

A further object is to provide an eyepiece in which the lens is formed integral with the frame which surrounds it, thus eliminating one joint and the danger of leakage of gas therethrough.

A further object is to provide an eyepiece of non-brittle material which will not be easily broken, and which, when broken, may be readily replaced without special tools.

A further object is to provide a protective rim for the lens.

The drawings illustrate an advantageous construction of the invention.

Figure 1:
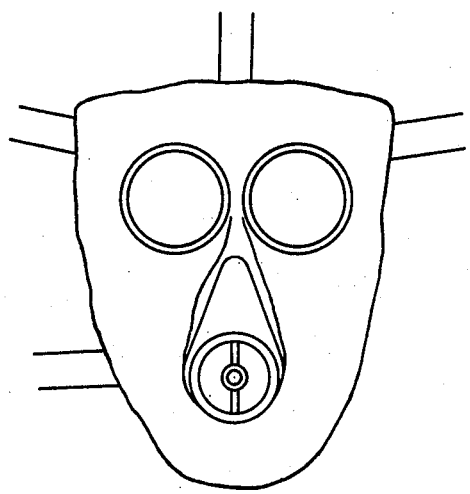

Fig. 1 is a front view of the invention as applied to a gas mask, and

Figure 2:
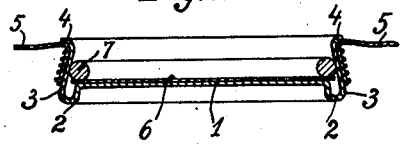

Fig. 2 a section through one of the eyepieces.

The eyepiece is made of one piece of any suitable transparent material (cellon, cellulose, celluloid and the like), the lens 1 being formed by a plain disk. The disk merges into an annular bead or protective rim 2 projecting in front of the said disk, and protecting it against injury. The protective rim 2 merges into the mounting which, similar to the known frames, made separate from the eye-piece, consists of a frusto conical flange 3 having its inner edge flared as at 4. The conical shape of the flange 3 allows the pliable material of the mask 5 to be connected thereto by winding cord about it in the manner illustrated. The inner face of the flange 3 forms a hold at its narrow part for the elastic hoop or ring 7 for firmly holding the transparent disk 6 in contact with lens 1.

I claim:—

1. An eyepiece for gas masks comprising a lens, a protecting rim extending forwardly of said lens, and a rearwardly tapering frusto-conical flange flared at its rear edge to provide means for securing the body of the mask thereto, said lens, rim and flange being formed integral.

2. An eyepiece for gas masks comprising a lens, a protective rim projecting forwardly of said lens, a rearwardly tapering frusto-conical flange flared at its rear edge to provide means for securing the body of the mask thereto, said flange, rim and lens being made of transparent material and being formed integral with each other, and a transparent disk held against the rear face of said lens.

3. An eyepiece for gas masks comprising a lens, a protective rim projecting forwardly of said lens, a rearwardly tapering frusto-conical mounting flange, said flange, rim and lens being formed integral with each other, a transparent disk positioned against the rear face of said lens, and an elastic ring seated within said flange and contacting with said disk to hold it in position.

In testimony whereof I have signed my name to this specification.

ALEXANDER BERNHARD DRÄGER.